United States Patent [19]

Hicks

[11] Patent Number: 4,754,153
[45] Date of Patent: Jun. 28, 1988

[54] OPERATING RADIATION SENSORS TO AVOID TRANSFER LOSS

[75] Inventor: Michael E. Hicks, Tring, Hertford, England

[73] Assignee: Crosfield Electronics Limited, London, England

[21] Appl. No.: 21,834

[22] Filed: Mar. 4, 1987

[30] Foreign Application Priority Data

Mar. 13, 1986 [GB] United Kingdom ............. 8606200

[51] Int. Cl.⁴ ............................................. H04N 3/14
[52] U.S. Cl. .............................. 250/578; 358/213.26; 358/212
[58] Field of Search ........... 250/578; 358/212, 213.26, 358/213.29, 167, 320

[56] References Cited

U.S. PATENT DOCUMENTS

| | | | |
|---|---|---|---|
| 4,216,503 | 8/1980 | Wiggins | 358/212 |
| 4,471,388 | 9/1984 | Dischert | 358/320 |
| 4,547,676 | 9/1985 | Suzuki et al. | 250/578 |
| 4,600,843 | 7/1986 | Kizu et al. | 358/213.29 |
| 4,682,212 | 7/1987 | Inuiya et al. | 250/578 |
| 4,686,373 | 8/1987 | Tew et al. | 250/578 |
| 4,698,515 | 10/1987 | Sepai | 250/578 |

OTHER PUBLICATIONS

English Abstract of Japanese 59-77774(A) May, 1984.

Primary Examiner—Edward P. Westin
Assistant Examiner—Charles Wieland
Attorney, Agent, or Firm—Sughrue, Mion, Zinn, Macpeak and Seas

[57] ABSTRACT

A method of operating a radiation sensor, such as a charged coupled device array, having a number of radiation sensitive devices and associated transfer buffers. The method comprises (1) illuminating the radiation sensor for a predetermined duration whereby the radiation devices each store a charge relating to the total radiation incident thereon; (2) after the illumination step, transferring the stored charges to the transfer buffers; (3) reading out the charges in the transfer buffers; and, (4) repeating steps 1 to 3 until the transferred charge is substantially constant. Image scanning apparatus incorporating apparatus for performing this method is also described.

7 Claims, 3 Drawing Sheets

OPERATING RADIATION SENSORS TO AVOID TRANSFER LOSS

FIELD OF THE INVENTION

The invention relates to apparatus and methods for operating a radiation sensor having at least one radiation sensitive device and associated transfer buffer. Such radiation sensors are hereinafter referred to as of the kind described.

DESCRIPTION OF THE PRIOR ART

Typical radiation sensors of the kind described comprise a large number of pairs of radiation sensitive devices and tranfer buffers, typically 1500 pairs or more. One example of such a radiation sensor is a charge coupled device (CCD) array such as the Fairchild CCD 151.

Radiation sensors of the kind described are commonly used in image scanning applications such as flat bed scanning where an image on a transparency or the like is illuminated with monochromatic radiation, the radiation passing from the image onto the radiation sensor which is typically a linear CCD array. This illumination is carried out for a predetermined duration allowing a charge relating to the total incident radiation to be stored in each radiation sensitive device. This stored charge is then transferred to the associated transfer buffer and the contents of the transfer buffers are then read out.

One of the problems that we have found in using such radiation sensors in image scanning systems is that the efficiency of transfer of charge from the radiation sensitive devices to the associated transfer buffers is not 100%. This means that after each transfer a proportion of the stored charge remains in the radiation sensitive devices and this leads to the generation of "ghost images" since the charge transferred corresponding to the next scan includes a proportion of the charge from the previous scan. In the past, attempts have been made to deal with this problem by developing complex processing techniques downstream of the radiation sensor but these techniques have not been particularly successful.

SUMMARY OF THE INVENTION

In accordance with one aspect of the present invention, a method of operating a radiation sensor of the kind described comprises (1) illuminating the radiation sensor for a predetermined duration whereby the at least one radiation sensitive device stores a charge relating to the total radiation incident thereon;

(2) after the illumination step, transferring the stored charge to the transfer buffer;

(3) reading out the charge in the transfer buffer; and, (4) repeating steps 1 to 3 until the transferred charge is substantially constant.

In accordance with another aspect of the present invention, image scanning apparatus comprises a light source; a light sensor having at least one light sensitive device and associated transfer buffer; means for illuminating an image and for causing light from the image to impinge on the light sensor; and processing means, whereby the light sensor and the image are relatively movable so that the image is scanned, the processor being adapted to operate the light sensor at each scanning position in accordance with a method according to the one aspect of the invention.

We have investigated the inefficient transfer problem, known as photosite transfer loss (PSTL) and have found that although at low levels of charge (typically corresponding to less than 1/40th of the charge arising from maximum illumination) the residual charge after each transfer varies depending upon the charge stored, at higher levels the residual charge is substantially constant. The invention makes use of this fact by building up the residual charge in the radiation sensitive device by illuminating the device at least twice so that after the second or last illumination step there is sufficient charge such that when this charge is transferred the residual charge will be the same as the residual charge after the preceding transfer. In this way, the charge transferred will correspond to the charge which should initially have been transferred if there had been 100% transfer efficiency and the radiation sensitive device had initially contained no charge.

The invention thus avoids the need for complex processing at the minor expense of needing an increased amount of illumination. Thus, instead of a single illumination step, at least two, preferably three illumination steps are needed. These additional illumination steps allow sufficient residual charge to build up in the radiation sensitive device or devices to achieve a constant residual charge so that an equilibrium is built up where the inefficiency of transfer and the residual charge compensate for each other.

In a typical image scanning process, the radiation sensitive device will receive in series monochromatic light of at least three different colours which have been used to illuminate an original image and due to the large differences in intensity of the three colours in a typical image, the steps of the method will be carried out for each colour. Relative movement between the sensor and the image will take place either continuously or in steps so that the entire image is scanned in known manner, the movement being slow compared with the time for performing the method according to the invention and slow enough to enable substantially the same area of the image to be illuminated with each colour.

Preferably, the charge read out in all but the last performance of step 3 is discarded in each group of repeated sets of steps 1 to 3.

Preferably, the radiation sensor is masked after step 1 while the method may further comprise an additional step prior to step 2 of reading out any charge in the transfer buffers or buffers. This compensates for any charge which may have been generated in the transfer buffers during the illumination of the sensor in step 1.

The invention is particularly applicable to the operation of CCD arrays, particularly linear CCD arrays.

As well as having application in image scanning techniques as mentioned above, the invention also has application in astronomy, in high quality reproduction colour or monochrome for documentation of films and in monitoring applications using television systems. The invention could also be used in telecine if films are required for retransmission, and in facsimile transmissions, particularly of colour.

BRIEF DESCRIPTION OF THE DRAWINGS

An example of image scanning apparatus for carrying out a method according to the invention will now be described with reference to the accompanying drawings, in which.

DETAILED DESCRIPTION OF AN EMBODIMENT

Figure 1:
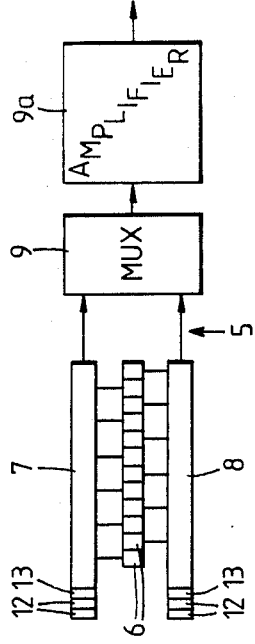
FIG. 1 is a schematic block diagram of the apparatus.

The image scanning apparatus comprises a source of white light 1, positioned at the focus of a converging lens 2 onto which light from the source is incident. A rotating filter disc 3 is positioned downstream of the lens 2 and light passing through the filter disc 3 is incident on a transparency 4. The transparency 4 is mounted in a conventional holder (not shown). Light from the transparency 4 impinges on a linear CCD array 5. This is a conventional flat bed scanning arrangement well known in the art and will not be described in detail.

The filter disc 3 may comprise three circumferentially spaced sectors arranged to transmit red, blue, and green light successively.

The CCD array 5 comprises a plurality of photodiodes 6 (FIG. 2) arranged in a line. In practice, there may be at least 3500 photodiodes 6. Two shift registers 7, 8 (constituting respective sets of transfer buffers) are positioned on either side of the photodiodes 6 and alternate photodiodes are electrically connected to the shift registers 7, 8 respectively. The serial outputs of the shift registers 7, 8 are connected to a multiplexer 9 which provides a multiplexed output corresponding to the contents of the photodiodes in sequence. The multiplexer 9 outputs to an output amplifier 9A within the CCD array which functions as a current to voltage converter. An example of a CCD array 5 is the Fairchild CCD 151.

The multiplexed output from the CCD array 5 is fed to a microprocessor 10 which selectively feeds the output, as described below, to a disc store 11.

Figure 2:
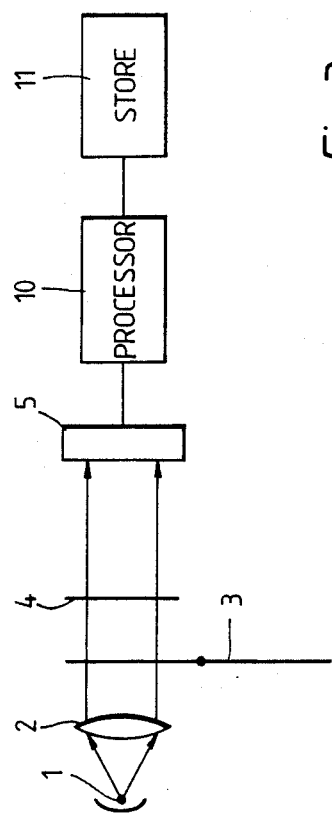
FIG. 2 is a schematic plan of the CCD array shown in FIG. 1.

It will be seen in FIG. 2 that the shift registers 7, 8 include a number of extra transfer buffers which are of two types 12, 13. The transfer buffers 12 are dark cells which are covered with an aluminium coating to provide an approximate indication of the dark level signal. These dark cells 12 are separated from the remainder of the transfer buffers by a number of isolation cells 13. For example, there may be five isolation cells 13 in each shift register 7, 8. In conventional CCD arrays, the purpose of the isolation cells 13 is simply to provide a buffer between the dark cells 12 and the remainder of the transfer buffers of the shift registers 7, 8.

In use, the filter disc 3 is rotated so that the transparency 4 is repeatedly illuminated by a series of red, green, and blue light. The light then impinges on the array 5 (including the shift registers 7, 8). Since the photodiodes are arranged in a line, the transmission properties of a corresponding line of the transparency 4 will be determined.

Figure 3:
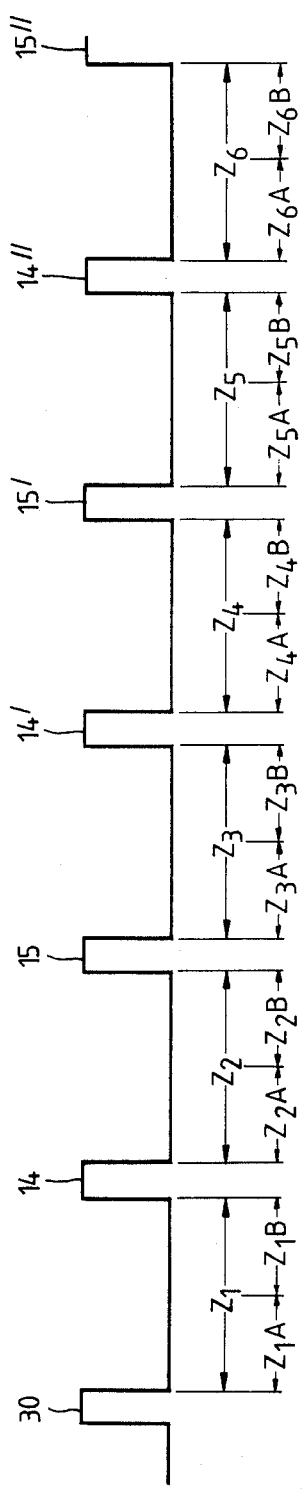
FIG. 3 is a pulse diagram for one example of a method of operating a CCD array according to the invention.
Figure 5:
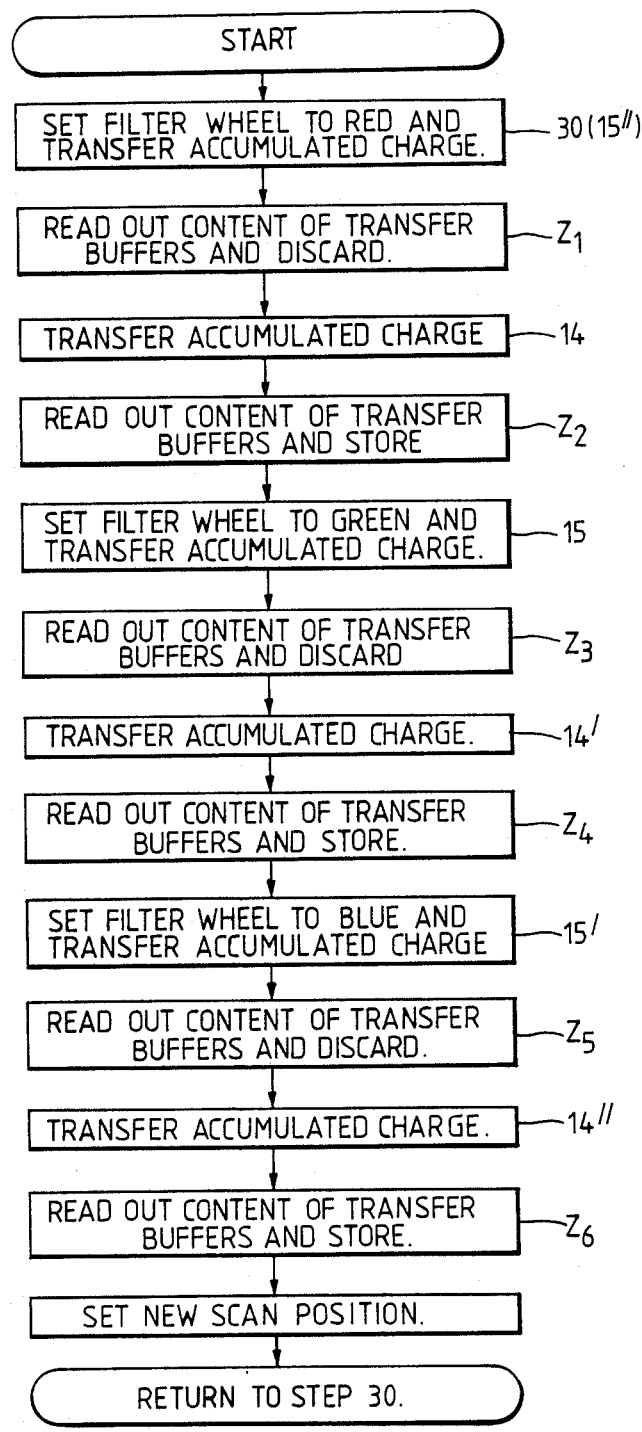

FIG. 3 illustrates a typical sequence of operation while FIG. 5 illustrates the steps in flow diagram form. During a step 30 a red filter in the filter wheel 5 is brought into alignment with the light beam from the lens 2 so that the transparency 4 is illuminated with red light and any accumulated charge is transferred to the shift registers 7, 8. During a subsequent step $Z_1$ charge is accumulated in the photodiodes 6 and at the same time the contents of the shift registers 7, 8 are serially shifted out at a predetermined clock rate via the multiplexer 9 to the microprocessor 10. In this example, the read out rate is selected so that all the cells in the shift registers 7, 8 including the dark cells 12 and isolation cells 13 are read out once during the period $Z_1$. This read out data is discarded. At the end of this period, the microprocessor 10 issues a transfer pulse 14 to transfer the charge accumulated in the photodiodes 6 into the shift registers 7, 8.

The transfer of charge from the photodiode 6 to the shift registers 7, 8 is not 100% efficient. Ideally, if for example the photodiodes store a charge equivalent (after conversion by amplifier 9A) to x mV then the same charge (x mV) should be transferred to the shift registers 7, 8. This ideal condition is indicated by a line 20 in FIG. 4. In practice, only a proportion of the charge stored in the photodiode 6 is transferred. The true amount is indicated by a line 21 in FIG. 4. Thus, for example, if the illumination of a photodiode 6 causes a charge which gives rise to 20 mV to be built up, the charge transferred to the shift register will be equivalent to about 9.5 mV as determined by the line 21. This leaves a residual charge equivalent to 11.5 mV in the photodiode. This residual charge is indicated by a line 22. It is important to note the form of the line 22 which rises rapidly from the origin of the graph to a substantially constant level equivalent to about 13.5 mV.

The set of steps just described are now repeated and include a step $Z_2$ (similar to step $Z_1$) in which the array continues to be illuminated under the same conditions as in step $Z_1$ (red light). During this step $Z_2$ the shift registers 7, 8 are again read out at the same clock rate via the multiplexer 9 to the processor 10. Preferably the duration of the pulse 14 (about 500 ns) is very small compared with $Z_1$ and $Z_2$ (about 3 ms).

Step $Z_2$ is terminated by a transfer pulse 15. Once again, the charge transferred at this stage will not be the entire charge stored in the photodiodes 6 but only a proportion of that stored charge. For example, if the residual charge in the photodiodes 6 from the previous transfer pulse 13 is equivalent to 11.5 mV then the total charge built up in the photodiodes during step $Z_2$ will be equivalent to 20 mV + 11.5 mV (i.e. 31.5 mV). Line 21 in FIG. 4 indicates that the charge transferred from the photodiodes in this situation will be equivalent to about 19.5 mV leading to a residual charge equivalent to 12 mV. It should be noticed that the transferred charge is now very close to the charge which should have been transferred at the end of step $Z_1$ (i.e. 20 mV).

Figure 4:
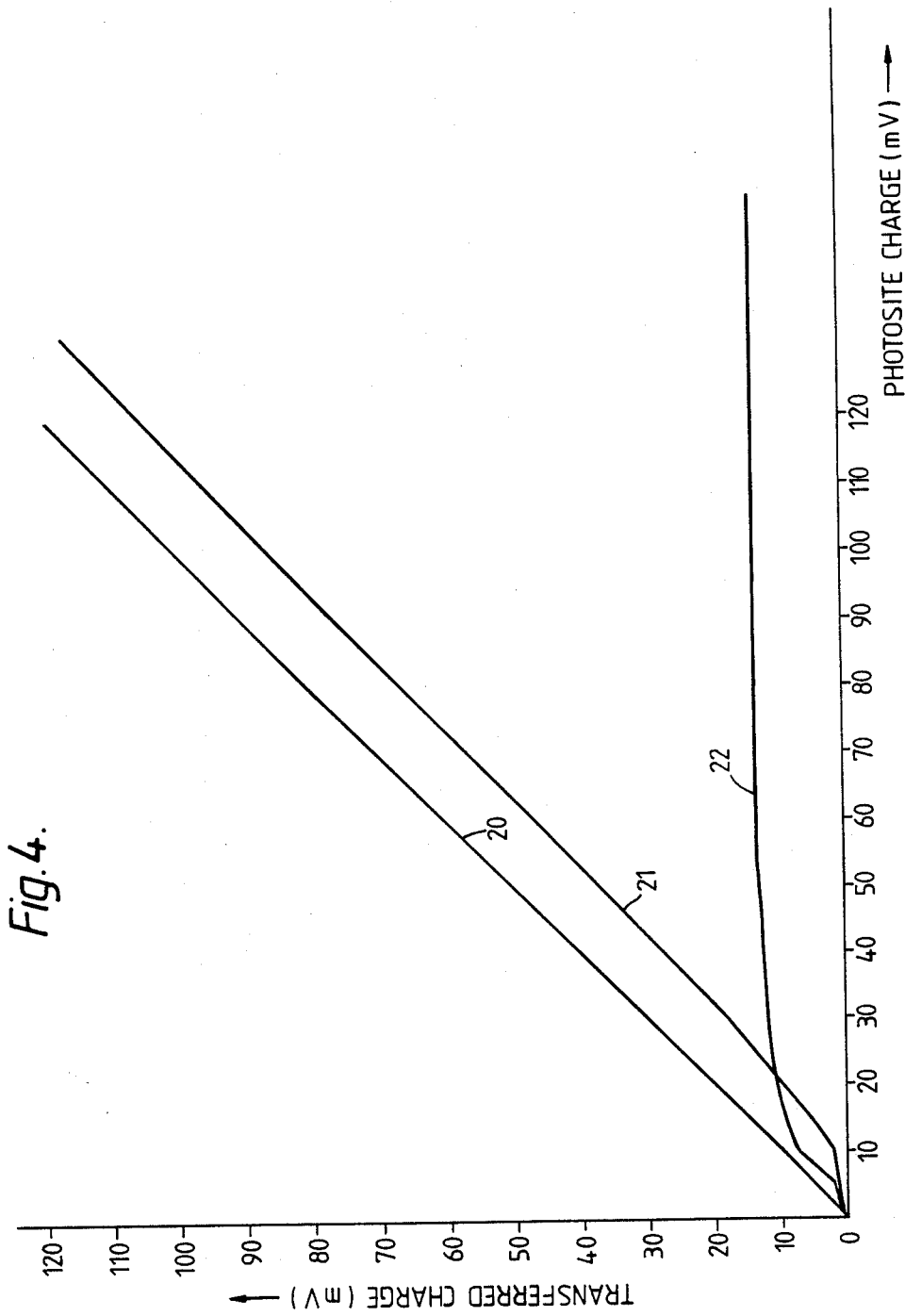
FIG. 4 illustrates graphically the charge transfer properties of a CCD array; and, FIG. 5 is a flow diagram illustrating operation of the microprocessor shown in FIG. 1.

In many cases, this will be sufficiently accurate for image scanning purposes. However, further accuracy can be obtained by repeating the steps one or more further times under the same illumination conditions and as can be seen by the line 22 in FIG. 4, the residual charge will rapidly approach a constant value so that a constant charge will be transferred to the shift registers in response to each transfer pulse. A number of such steps may be required where the degree of illumination is low as can be seen in FIG. 4, in order to build up the residual charge to its constant level. In the simplest case only two steps are needed although in practice three steps are preferred.

It should be understood that the read out data from the shift registers 7, 8 is discarded apart from the data corresponding to the last illumination step for each colour and each image area, this data being fed to the store 11 after correction for the dc offset by the microprocessor 10.

The filter wheel 3 is then rotated to cause the green filter to come between the converging lens 2 and the transparency 4 so that the transparency 4 is exposed to green light. This occurs at the time of a transfer pulse 15 (where only the two steps $Z_1$ and $Z_2$ are required) and is followed by step $Z_3$ equivalent to the step $Z_1$ in which substantially the same area of the transparency 4 is imaged onto the array 5. The data read out during the step $Z_3$, as with the data read out during the step $Z_1$, is discarded by the microprocessor 10.

After a transfer pulse 14', step $Z_4$ is carried out (being a repeat of step $Z_3$), the transparency still being illuminated with green light and after step $Z_4$ further rotation of the filter disc 3 occurs (at the same time as a transfer pulse 15' equivalent to the transfer pulse 15) to bring the blue filter into alignment with the lens 2 and transparency 4.

Steps $Z_5$, $Z_6$ are then carried out (similar to steps $Z_1$, $Z_2$) separated by a transfer pulse 14''. After this latest step $Z_6$, a further transfer pulse 15'' (equivalent to the transfer pulse 15) is issued and at the same time the transparency 4 is shifted by for example a stepper motor to bring a new line of pixels of the image carried by the transparency into alignment with the CCD array 5.

In a modified example, each of the steps $Z_1$, $Z_2$ etc is divided into two (preferably equal duration) subsidiary steps $Z_1^A$, $Z_1^B$ etc. In each of these subsidiary steps the contents of the shift registers are fully read out but it is important to note that the read out rate of the step $Z_1^B$ is the same as that of $Z_2^A$ to ensure that the peripheral response remains constant when real data is being read out.

As an alternative to the filter disc system described, the method can be carried in a frame sequential colour scanning system.

I claim:

1. A method of operating a radiation sensor having at least one radiation sensitive device and an associated transfer buffer, comprising the steps of:

(a) illuminating a radiation sensor for a predetermined duration such that at least one radiation sensitive device stores a charge relating to the total radiation incident thereon;
   (b) after said illuminating step, transferring said stored charge from the radiation sensitive device to an associated transfer buffer;
   (c) reading out said charge in said transfer buffer; and,
   (d) repeating steps (a) to (c) until the charge transferred to the transfer buffer is substantially constant.

2. A method according to claim 1, wherein steps (a) to (c) are repeated at least twice.

3. A method according to claim 1, wherein the charge read out in all but a last performance of step (c) is discarded in each group of repeated sets of steps (a) to (c).

4. A method according to claim 1, wherein said radiation sensor is masked after step (a).

5. A method according to claim 1, further comprising, prior to step (b), an additional step of reading out any charge in said at least one transfer buffer.

6. A method according to claim 1, wherein said radiation sensor comprises a linear charge coupled device array.

7. Image scanning apparatus, comprising: a radiation source; a radiation sensor having at least one radiation sensitive device (6) and an associated transfer buffer; means for illuminating an image and for causing radiation from said image to impinge on said radiation sensor; said radiation sensor and said image being relatively movable so that said image is scanned; and processing means for operating said radiation sensor at each scanning position to:

(a) illuminate said radiation sensor for a predetermined duration such that said at least one radiation sensitive device stores a charge relating to the total radiation incident thereon;
   (b) after said illumination step, transfer said stored charge to said transfer buffer;
   (c) read out said charge in said transfer buffer; and,
   (d) repeat (a) to (c) until the charge transferred to the transfer buffer is substantially constant.

* * * * *